UNITED STATES PATENT OFFICE.

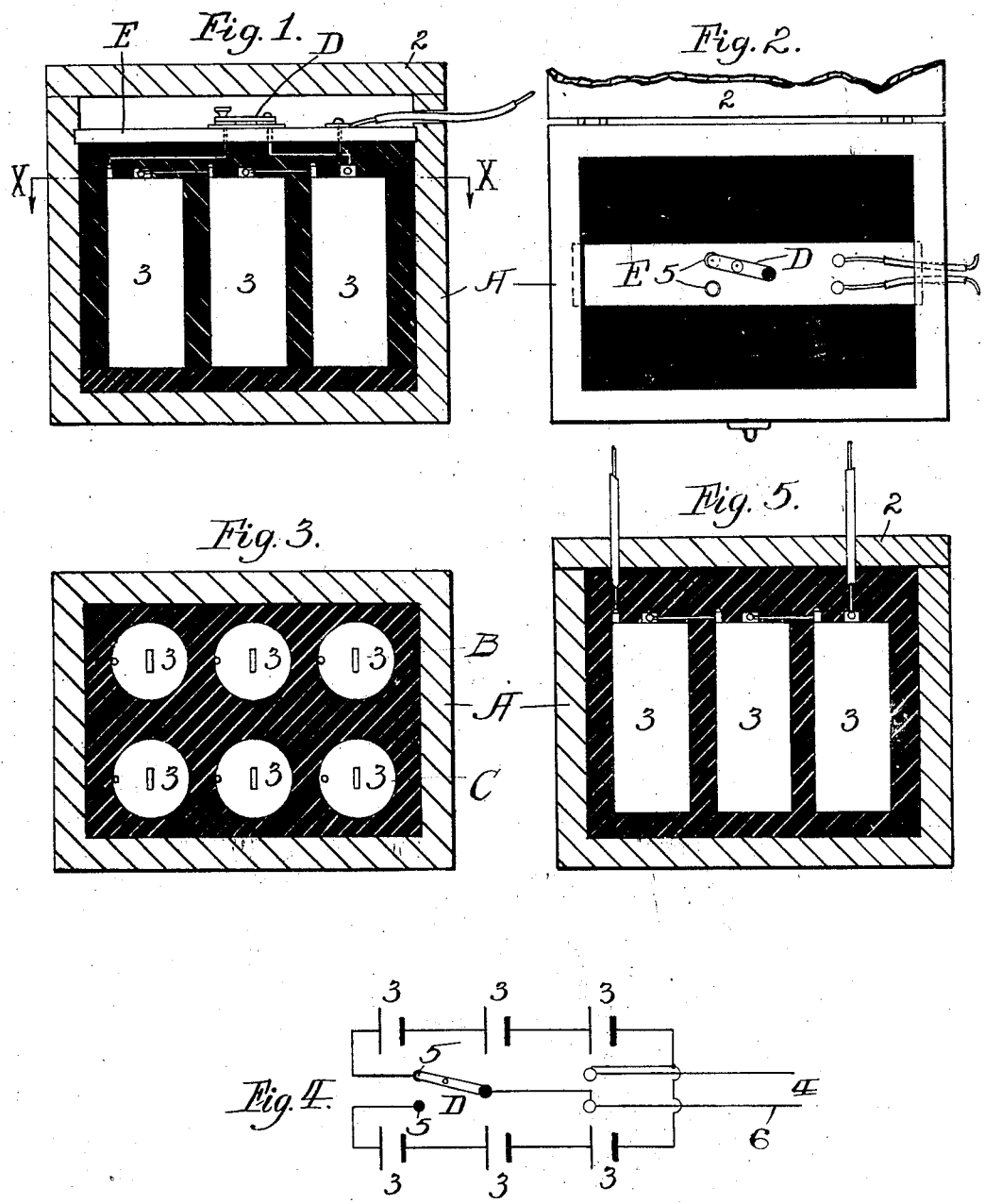

BERTRAM B. DOWNS, OF ST. PAUL, MINNESOTA.

BATTERY.

No. 855,880.  Specification of Letters Patent.  Patented June 4, 1907.

Application filed April 2, 1906. Serial No. 309,348.

*To all whom it may concern:*

Be it known that I, BERTRAM B. DOWNS, a citizen of the United States, residing at St. Paul, in the county of Ramsey and State of Minnesota, have invented a new and useful Battery, of which the following is a specification.

My invention relates to new and useful improvements in dry batteries and has for its object as a new article of manufacture two or more cells arranged to constitute a battery, each cell being hermetically sealed from air and moisture and immovably arranged to constitute a single unit.
Batteries of this kind can be used to advantage for a number of purposes, such as for the ignition of gasolene engines, on automobiles and elsewhere and for lighting gas lamps and ringing bells, with greater efficiency than heretofore and without short-circuiting between the cells.

Among other objects are to protect the cells from heat and cold and to provide switching apparatus for throwing in or cutting out part or all of said cells. Heretofore, where any attempt has been made to provide a battery of this nature the cells have not been hermetically sealed nor has any switching apparatus been used.
In the accompanying drawings forming part of this specification, Figure 1 is a sectional side elevation of my invention; Fig. 2 is a plan view, showing a portion of the cover open; Fig. 3 is a section of Fig. 1, taken on the line X—X; Fig. 4 is a diagrammatic view of the circuit connections and switching apparatus, and Fig. 5 is a sectional view of an alternate construction.

In the drawings A represents an inclosure, which may be of any suitable form, shape and size desired. This inclosure is substantially a square box, although I have constructed it in the form of a pail having a bail, which is more convenient for some purposes.
The inclosure shown is provided with a cover or lid 2, which is hinged or otherwise attached to the body thereof. In this inclosure are placed cells 3 of a battery, which may be electrically connected as desired, the diagram shown in Fig. 4 illustrating one method of connection. In this diagram the cells 3 are divided into two series B and C, each series being connected with one side of the line circuit 4 and with points 5 on the switch D.
The opposite side 6 of the main circuit is connected to the switch arm, so that when the switch is thrown over the contacts either one or the other of said series of cells is included in the main circuit. The connections may be soldered to prevent them from loosening. The switch D is mounted on the switchboard E, which is carried by the frame above the cells in the inclosure. Each cell is of ordinary type, except that it does not include the usual paper jacket which is invariably used on dry cells.

A coating of melted wax or any suitable insulating sealing compound or material is poured upon the floor of the inclosure to a depth of a half inch (more or less), and after hardening the cells are placed on the insulating material and electrically connected, as desired, with the switchboard, care being taken that the cells are spaced apart and from the walls of the inclosure. Melted wax or other sealing compound, which melts at a lower temperature than that of the insulating material, on the floor is then poured into the inclosure until the cells and their connecting wires are entirely submerged, the inclosure being filled with sealing compound preferably level with the switchboard. The battery is then allowed to stand until said compound hardens. By this means the cells are held firmly in place and sealed from the air and moisture, and all danger of short-circuiting or depreciating in efficiency by contact with the air or by heat and cold is obviated.

In the alternate construction the cells are submerged in a single sealing compound, which is allowed to solidify while the cells are in suspended position. The cells may be suspended during this operation by any suitable means desired. I have employed a series of hooks, which are released when the insulating compound is in a semi-hardened condition. A melted compound may be poured into the openings left by the hooks to complete the sealing process.

Where I have used the term "sealing compound" I mean it to include insulating materials, such as wax, asphaltum and mixtures thereof or any other suitable insulating materials which melt at comparatively low temperatures.

Having described my invention, what I claim as new and desire to protect by Letters Patent, is:—

A new article of manufacture, comprising a battery of dry cells suitably connected and having their outer electrodes separated from each other, a suitable inclosure common to all of said cells, a layer of solid insulating compound in said inclosure on which said cells rest, and a solid insulating compound adapted to melt at a lower temperature than said layer and covering said cells and their connections.

In testimony whereof I have signed my name to this specification in the presence of two subscribing witnesses.

BERTRAM B. DOWNS.

Witnesses:
 ELSIE M. BOESEL,
 F. G. BRADBURY.